United States Patent
Bernard et al.

(10) Patent No.: US 12,388,318 B2
(45) Date of Patent: Aug. 12, 2025

(54) COVER FOR A ROTATING ELECTRIC MACHINE

(71) Applicant: VALEO EQUIPEMENTS ELECTRIQUES MOTEUR, Creteil (FR)

(72) Inventors: Clement Bernard, Creteil (FR); Benoit Walme, Creteil (FR); Charlie Zanella, St Quentin Fallavier (FR); Sebastien Beaucote, St Quentin Fallavier (FR); David Dumontagne, Creteil (FR); Charles Dumez, Creteil (FR); Mario Da Cruz Rebelo, Creteil (FR); Abdelaziz Azizi Samir, Creteil (FR); Manuel Falguier, Creteil (FR)

(73) Assignee: VALEO EQUIPEMENTS ELECTRIQUES MOTEUR, Creteil (FR)

( * ) Notice: Subject to any disclaimer, the term of this patent is extended or adjusted under 35 U.S.C. 154(b) by 268 days.

(21) Appl. No.: 17/907,641

(22) PCT Filed: Mar. 9, 2021

(86) PCT No.: PCT/EP2021/055857
§ 371 (c)(1),
(2) Date: Sep. 28, 2022

(87) PCT Pub. No.: WO2021/197770
PCT Pub. Date: Oct. 7, 2021

(65) Prior Publication Data
US 2023/0155447 A1    May 18, 2023

(30) Foreign Application Priority Data
Apr. 2, 2020  (FR) ........................ 2003283

(51) Int. Cl.
*H02K 5/20* (2006.01)
*H02K 9/04* (2006.01)

(52) U.S. Cl.
CPC ............... *H02K 5/207* (2021.01); *H02K 9/04* (2013.01); *H02K 2213/03* (2013.01)

(58) Field of Classification Search
CPC ............ H02K 5/207; H02K 5/18; H02K 5/20; H02K 5/22; H02K 5/225; H02K 9/04;
(Continued)

(56) References Cited

U.S. PATENT DOCUMENTS

2013/0084197 A1 * 4/2013 Mueller ............... F04D 29/5813
                                                              417/366
2013/0257193 A1   10/2013 Toda et al.
2019/0190351 A1    6/2019 Gregorich et al.

FOREIGN PATENT DOCUMENTS

EP    3 503 355 A1    6/2019
FR    2950752 A1 *   4/2011    ........... H02K 11/048
(Continued)

OTHER PUBLICATIONS

Machine Translation of JP_2018207640_A (Year: 2018).*
(Continued)

*Primary Examiner* — Alexander A Singh
*Assistant Examiner* — Charlie Frank Mann, Jr.
(74) *Attorney, Agent, or Firm* — Oblon, McClelland, Maier & Neustadt, L.L.P.

(57) ABSTRACT

A cover for a rotating electric machine includes an axis of rotation (X), the cover being designed to be arranged on an inverter of the machine. The cover includes a skirt extending in a radial direction and forming a perimeter of the cover, the perimeter defining an inner portion of the cover and an open area arranged in the inner portion and comprising at least
(Continued)

one axial opening. The open area extends over at least 50% of the inner portion of the cover.

16 Claims, 3 Drawing Sheets

(58) Field of Classification Search
CPC .......... H02K 9/06; H02K 11/30; H02K 11/33; H02K 2213/03
See application file for complete search history.

(56) References Cited

FOREIGN PATENT DOCUMENTS

| | | | |
|---|---|---|---|
| JP | 2012/143035 A | 7/2012 | |
| JP | 2018/084152 A | 5/2018 | |
| JP | 2018207640 A | * 12/2018 | |
| WO | WO-2018138448 A1 | * 8/2018 | ........... H02K 11/048 |

OTHER PUBLICATIONS

Machine Translation of WO_2018138448_A1 (Year: 2018).*
Machine Translation of FR_2950752_A1 (Year: 2011).*
International Search Report issued May 26, 2021 in PCT/EP2021/055857 filed on Mar. 9, 2021, 2 pages.
Office Action issued in corresponding Japanese Patent Application No. 2022-559982 on Nov. 7, 2023 (English translation only); pp. 1-5.

* cited by examiner

COVER FOR A ROTATING ELECTRIC MACHINE

BACKGROUND OF THE INVENTION

Field of the Invention

The invention relates, in particular, to a cover for a rotating electric machine.

The invention is particularly advantageously applicable in the field of rotating electric machines such as alternators, starter-alternators, or even reversible machines or electric motors. By way of a reminder, a reversible machine is a rotating electric machine capable of working in a reversible manner, on the one hand, as an electric generator in the alternator function and, on the other hand, as an electric motor, for example, in order to start the heat engine of the vehicle such as a motor vehicle.

Description of the Related Art

A rotating electric machine comprises a rotor that is free to rotate about an axis, and a fixed stator. In alternator mode, when the rotor is rotating, it induces a magnetic field at the stator, which converts it into electric current in order to supply power to the electrical consumers of the vehicle and to recharge the battery. In motor mode, the stator is electrically powered and induces a magnetic field that rotates the rotor, for example, in order to start the heat engine.

The assembly formed by the rotor and the stator is arranged in a casing on which an inverter is arranged. The inverter, which forms an electronic assembly of the machine, is conventionally protected by a cover. The cover has a plate extending in a radial direction to cover an axial end surface of the inverter and a skirt extending in an axial direction from the plate to cover a circumferential periphery of the inverter. The plate and/or the skirt may have openings allowing a cooling air flow to pass through.

Such a cover does not have an optimized shape helping to protect the elements of the rotating electric machine without degrading performances in terms of cooling said elements.

BRIEF SUMMARY OF THE INVENTION

The aim of the present invention is to help avoid the drawbacks of the prior art by proposing an optimized cover shape.

To this end, the present invention therefore relates to a cover for a rotating electric machine comprising an axis of rotation. The cover is intended to be arranged on an inverter of said machine and comprises a skirt extending in an axial direction and forming a perimeter of the cover, the perimeter defining an inner portion of the cover and an open region arranged in the inner portion and comprising at least one axial opening. According to the present invention, the open region extends over at least 50% of the inner portion of the cover.

The presence of such an open region on the cover helps considerably improve the passage of the cooling air flow, thus allowing better cooling of the inverter without affecting the mechanical strength of the cover or the protection of the elements of the machine against the external environment. Indeed, enlarging the area of the opening in the cover makes it possible, inter alia, to facilitate the circulation of the air flow between the cover and the inverter and, in particular, on the axial end surface of the inverter. Moreover, this novel cover shape also helps to reduce the axial space requirement of the machine, as well as its weight, and to simplify the arrangement of the inverter and in particular of the connector for connecting the inverter to the general computer of the vehicle in which the machine is mounted.

According to one embodiment, the open region extends over at least 70% of the inner portion of the cover and in particular 84%. This increase in the dimensions of the open region helps further optimize the shape of the cover in order to improve the cooling of the inverter.

According to one embodiment, the open region extends over the whole of the area of the inner portion.

According to one embodiment, the axial opening of the open region extends over at least 50% of the inner portion of the cover. It should be understood here that the cover has at least one opening extending over at least 50% of the inner portion of the cover. The cover may also have other openings.

According to one embodiment, the open region comprises several axial openings. This makes it possible to enlarge the open region while maintaining the possibility of adding elements such as protection, gripping or mechanical strength elements in the inner portion. Alternatively, the open region may be formed from a single axial opening.

According to one embodiment, the cover comprises at least one axial protection portion intended to be arranged axially opposite at least one phase connection of the machine, the axial protection portion extending into the inner portion. The axial protection portion helps protect the electrical connection between the phases of the stator and the inverter from the external environment in order to ensure safe operation of the machine.

For example, the axial protection portion extends from the skirt.

According to one embodiment, the skirt comprises at least one radial protection portion intended to be arranged radially opposite at least one phase connection of the machine. This radial protection portion helps protect the phase connection of the machine from the external environment.

According to one embodiment, the skirt comprises at least two radial protection portions, each being intended to be arranged radially opposite at least one phase connection of the machine, and at least one connecting portion extending circumferentially between said two radial protection portions, the connecting portion having a height, in an axial direction, less than the height, in an axial direction, of the radial protection portions. The difference in height between the radial protection portions and the connecting portion makes it possible to arrange a primary radial opening region in the cover. The radial opening helps improve the cooling of the inverter. For example, the primary radial opening region is formed from one or more primary radial openings.

According to one embodiment, the height of the connecting portion is less than half the height of a radial protection portion. In other words, the height of the primary radial opening region, in an axial direction, is greater than half the axial thickness of the radial protection portion.

According to one embodiment, the skirt is formed from a succession of radial protection portions and connecting portions.

According to one embodiment, each radial protection portion comprises a secondary radial opening region. This also helps improve the cooling of the machine. For example, the secondary radial opening region is formed from one or more secondary radial openings.

For example, the area of the secondary radial opening region is between 15% and 25% of the area of the associated protection portion. This helps improve the cooling of the machine while ensuring the mechanical strength of the cover and protecting the machine from the external environment.

According to one embodiment, the skirt forms a closed perimeter. This helps improve the mechanical strength of the cover.

According to one embodiment, the cover further comprises at least one fastening portion, the fastening portion being intended to cooperate with a fastening element in order to mount the cover on an inverter of the rotating electric machine, the fastening portion extending into the inner portion.

For example, the axial fastening portion extends from the skirt or from the axial protection portion or from the gripping means.

According to one embodiment, the fastening portion extends in a radial direction and comprises an opening through which the fastening element can pass.

According to one embodiment, the cover further comprises at least one gripping means extending into the inner portion. This gripping means makes it possible, during the process of assembling the machine, to simplify the arrangement of the cover on the inverter before they are fastened together.

For example, the gripping means extends from the skirt or from the fastening portion or from the axial protection portion.

According to one embodiment, the gripping means is formed from a planar portion extending in a radial plane. This makes it possible to move the cover without increasing the axial space requirement of the machine. This may also provide a labelling area for recording the references of the machine.

According to one embodiment, a set-back portion is formed at at least one end of the gripping means so that said means extends axially at a distance from the skirt. This helps reduce the axial height of the skirt in order to improve the cooling of the machine.

The present invention also relates to a rotating electric machine comprising an inverter and a cover as previously described, the cover being mounted on the inverter. The rotating electric machine can, advantageously, form an alternator, a starter-alternator, a reversible machine or an electric motor.

According to one embodiment, the inverter comprises a power stage for supplying power to the phases of a stator of the machine and/or for rectifying the current leaving said phases. The inverter further comprises a control stage for controlling the machine.

According to one embodiment, the inverter comprises at least one heat sink plate, said plate forming, at least partially, one axial end of said inverter and being arranged at least partially facing the open region. The heat sink plate helps to protect the elements of the inverter from the external environment and also to improve the cooling of the inverter by conduction.

According to one embodiment, the inverter comprises a capacitor bank and the open region is arranged so as to be at least partially axially aligned with the capacitor bank.

According to one embodiment, the machine comprises a casing arranged to at least partially surround a stator and a rotor of said machine, the inverter being arranged axially between the cover and the casing.

According to one embodiment, the rotating electric machine further comprises a shutter arranged at one axial end of the inverter, the shutter comprising a radially extending portion arranged opposite a capacitor bank of the inverter. The radially extending portion helps to protect the capacitor bank from the external environment.

According to one embodiment, the machine comprises a casing arranged to at least partially surround a stator and a rotor of said machine, the shutter being arranged axially between the casing and the inverter. The shutter makes it possible to at least partially cover axial openings arranged in the casing. The shutter therefore helps prevent a cooling air flow that has already been heated by the rotor or the stator from circulating in the inverter.

According to one embodiment, the power stage and the control stage are axially superposed so as to define a cooling passage between them, the primary radial opening region being in particular at least partially arranged facing said cooling passage.

According to one embodiment, the machine comprises a stator comprising at least one phase terminal and the inverter comprises at least one power module comprising at least one power terminal, the power terminal being electrically connected to the phase terminal in order to form a phase connection.

BRIEF DESCRIPTION OF THE SEVERAL VIEWS OF THE DRAWINGS

The present invention may be better understood upon reading the following detailed description of nonlimiting exemplary embodiments of the invention and upon studying the appended drawings.

DETAILED DESCRIPTION OF THE INVENTION

Identical, similar or comparable elements use the same reference signs from one figure to the next. It also should be noted that the various figures are not necessarily to the same scale. In addition, the embodiments which are described hereinafter are in no way limiting. In particular, it is possible to conceive of variants of the invention comprising only a selection of features described hereinafter, in isolation from the other features described.

Figure 1:
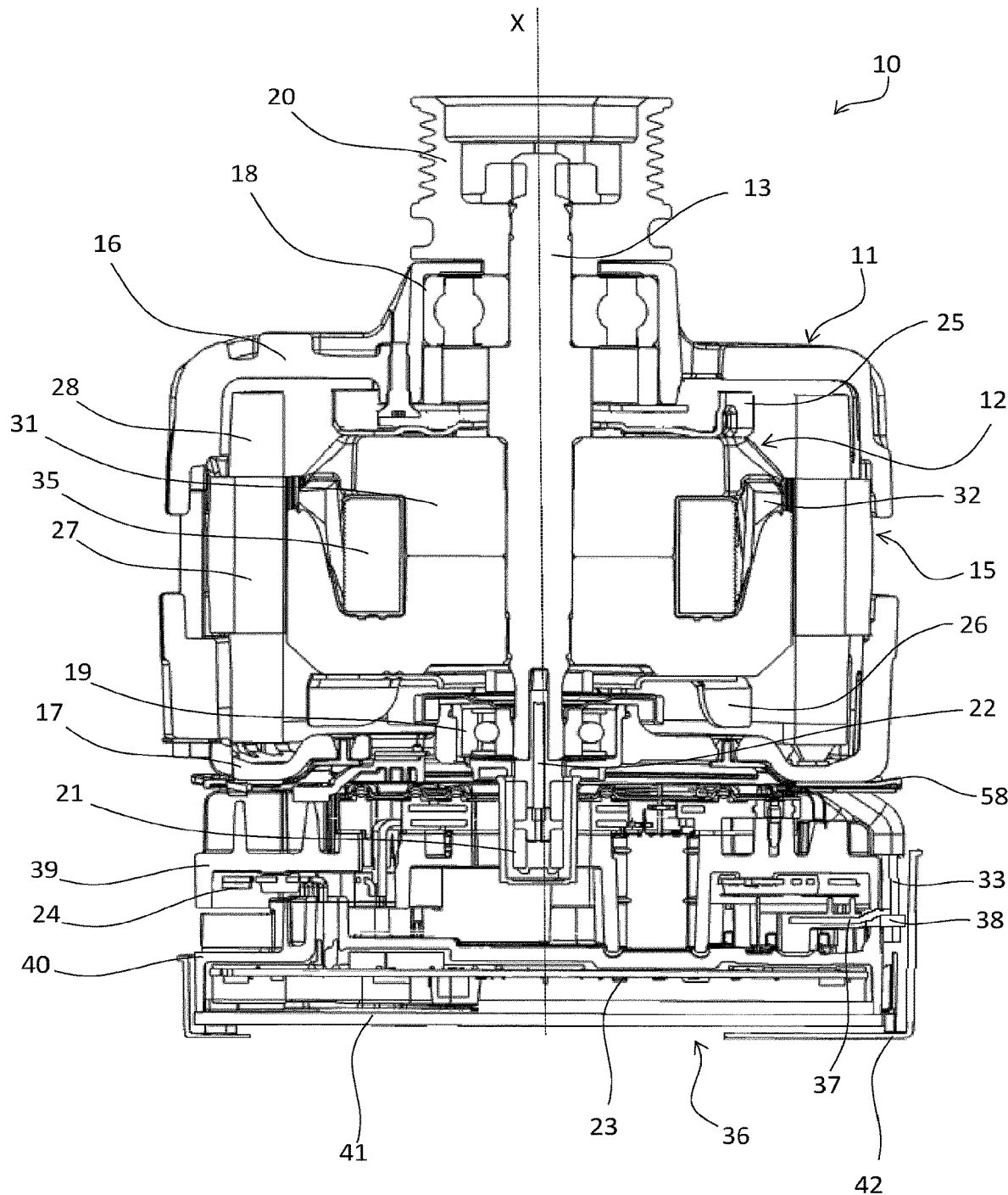
FIG. 1 shows a schematic and partial sectional view of a rotating electric machine according to one example of the invention.

FIG. 1 depicts an example of a compact and polyphase rotating electric machine 10, in particular for a vehicle such as a motor vehicle or a drone. This machine 10 converts mechanical energy into electrical energy, in alternator mode, and can operate in motor mode in order to convert electrical energy into mechanical energy. This rotating electric machine 10 is, for example, an alternator, a starter-alternator, a reversible machine or an electric motor.

In this example, the machine 10 comprises a casing 11 on which an inverter 36 is mounted. Inside this casing 11, it further has a shaft 13, a rotor 12 which rotates as one with the shaft 13 and a stator 15 surrounding the rotor 12. The rotational movement of the rotor 12 takes place about an axis X. In the rest of the description, the axial direction corresponds to the axis X, which passes through the shaft 13 at the center thereof, while the radial orientations correspond to planes that are concurrent with, and in particular perpendicular to, the axis X. For the radial directions, the term inner corresponds to an element oriented toward the axis, or closer to the axis than a second element, and the term outer denotes distance from the axis.

In this example, the casing 11 comprises a front end plate 16 and a rear end plate 17 which are joined together. These end plates 16, 17 are hollow in form and each centrally bear a bearing carrier coupled to a respective ball bearing 18, 19 for the rotational mounting of the shaft 13. Moreover, the casing 11 has fastening means (not shown) for mounting the rotating electric machine 10 in the vehicle.

A drive member such as a pulley 20 may be fastened to a front end of the shaft 13. This member makes it possible to transmit the rotational movement to the shaft or allows the shaft to transmit its rotational movement to the belt. In the rest of the description, the terms front/rear refer to this member. Thus, a front face is a face oriented in the direction of the member, while a rear face is a face oriented in the direction away from said member.

The rear end of the shaft 13 bears, in this case, slip rings 21 belonging to a commutator 22. A brush holder (not shown) comprises brushes arranged in such a way as to rub on the slip rings 21. The brush holder is connected to the inverter 36 and, in particular, to a control module 23 of the inverter.

The front end plate 16 and the rear end plate 17 may have substantially lateral openings for the passage of an air flow in order to allow the machine 10 to be cooled by air circulation brought about by the rotation of a front fan 25 arranged on a front axial face of the rotor 12 and of a rear fan 26 arranged on a rear axial face of said rotor.

In this example, the rotor 12 is a claw-pole rotor comprising two pole wheels 31. Each pole wheel 31 is formed from a plate oriented transversely, a plurality of claws forming magnetic poles, and a cylindrical core. The rotor has a coil 35 wound around the core. For example, the slip rings 21 belonging to the commutator 22 are connected by wire connections to said coil 35. The rotor 12 may also comprise magnetic elements 32, such as permanent magnets, interposed between two adjacent claws. Alternatively, the rotor may be formed from a stack of laminations housing permanent magnets forming the magnetic poles.

In this exemplary embodiment, the stator 15 has a body 27 formed from a stack of laminations provided with slots, equipped with a slot insulator for the mounting of an electric winding 28. The winding passes through the slots in the body 27 and forms a front overhang and a rear overhang on either side of the body of the stator. Furthermore, the winding 28 is formed from one or more phases comprising at least one electrical conductor. Each phase comprises an end forming a phase output 33 which is electrically connected to the inverter 36.

The inverter 36, which is in this instance mounted on the casing 11, forms the electronic assembly of the machine. The inverter comprises a power stage used to receive or supply an electric power signal from or to the electrical phases of the winding 28. The power stage comprises at least one power module 24 comprising a power terminal 37 arranged to be electrically connected to a phase output 33 in order to form a phase connection 38. The power module forms a bridge voltage rectifier for converting the AC voltage generated by the phases of the stator into a DC voltage and/or, conversely, for converting a DC voltage into an AC voltage to be fed to the phases of the stator. The inverter also comprises a control stage comprising a control module 23 making it possible, in particular, to regulate the voltage injected via the brush holder to rotor 12 and providing the interface with a computer external to the vehicle.

Figure 2:
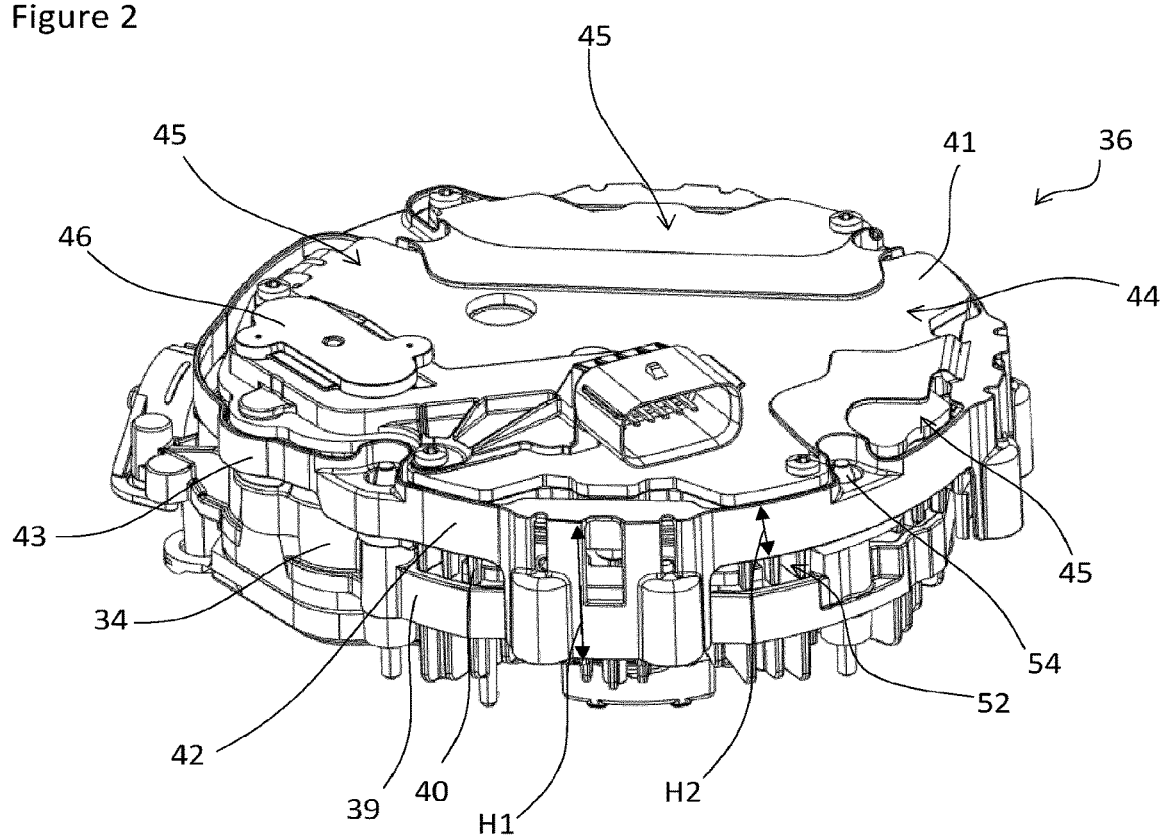
FIG. 2 shows a schematic and partial perspective view of an example of a cover according to the invention mounted on an inverter.

In the example shown in FIGS. 1 and 2, the power stage and the control stage are stacked on each other in an axial direction. More particularly in this example, the power stage comprises a heat sink, referred to as the first heat sink 39, mounted on the casing 11, the power module 24 being mounted on said first heat sink. Moreover, the control stage comprises a heat sink, referred to as the second heat sink 40, mounted on the first heat sink 39, the control module 23 being mounted on said second heat sink. For example, the two heat sinks are each formed from a thermally conductive material such as metal.

The inverter 36 also comprises at least one capacitor (not shown) for filtering electrical signals from the inverter. The capacitor is arranged in a capacitor bank 34 which may contain one or more capacitors. The capacitor bank is arranged, for example, in a recess in the first heat sink 39. Said recess may be closed by the second heat sink 40. The capacitor bank 34 is, in this instance, arranged between the two heat sinks in order to improve the cooling of said bank.

The machine 10 further comprises a cover 42 mounted on the inverter 36. For example, the cover is formed from an electrically insulating material such as plastic. By way of further example, the cover is a one-piece component and is, in particular, formed as a single part, for example by molding.

The cover 42 comprises a skirt 43 extending in an axial direction and forming a perimeter of the cover. In other words, the perimeter forms an outer periphery inside which an inner portion of the cover is defined. The cover 42 has an open region 44 arranged in the inner portion. The open region 44 extends over at least 50%, and in particular at least 70%, of an axial end area of the inner portion of the cover 42. The axial end area of the inner portion of the cover is defined as being the area delimited by the perimeter of the skirt. In other words, the cover 42 is closed axially over an area covering less than half the total axial end area of said cover.

In the example shown in FIG. 2, the open region 44 extends over an area equal to 84% of the axial end area of the inner portion of the cover 42. The temperature of the inverter 36 at a given speed is, on average, with this example of the opening percentage of the open region, approximately 143.2° C., whereas the temperature of an inverter of the prior art comprising a conventional cover that has an opening percentage of less than 20% is approximately 147° C. With this exemplary embodiment of the invention, the temperature of the inverter 36 at a given speed has therefore dropped by 3.8° C. compared to a cover of the prior art.

The open region 44 may be arranged in such a way as to be at least partially axially aligned with the capacitor bank 34. Moreover, in this example, the inverter 36 comprises a heat sink plate 41 arranged to cover the control stage. For example, the heat sink plate 41 is formed from a metal material. More specifically, a thermal adhesive may be arranged between the part of the second heat sink 40 in contact with the capacitor bank 34 and the heat sink plate 41. This helps improve the cooling of the capacitor bank by conduction. The fact that the cover 42 is axially open over at least 50% of its area and in particular above the capacitor bank 34 helps further improve the cooling of said bank. Indeed, the rear axial end surface of the heat sink plate 41 is exposed to a greater quantity of cooling air flow, and this also helps prevent hot air from stagnating axially between the cover 42 and said plate 41.

The open region 44 is arranged facing the heat sink plate 41. Moreover, in this instance, a signal connector 46 is arranged to pass through said plate 41 and the open region 44 in order to connect the control module 23 to a computer external to the vehicle for controlling the machine.

The open region 44 is formed from at least one axial opening 45. In the example shown in FIGS. 2 and 3, the open region comprises three axial openings 45. The openings 45 are in this instance of different shapes and sizes.

The cover 42 may comprise at least one axial protection portion 47 arranged axially opposite at least one phase connection 38. The axial protection portion extends into the inner portion from the skirt 43. Said portion 47 extends in a radial direction. In the example shown in FIG. 2, the stator 15 comprises six phase outputs 33 grouped into pairs along the circumference of the machine. Therefore, in this instance, the cover 42 comprises three axial protection portions 47, each being arranged axially opposite two phase connections 38. Alternatively, each axial protection portion could be arranged opposite a single phase connection or a number of phase connections greater than two.

The skirt 43 extends circumferentially so as to at least partially surround the inverter 36 and, in particular, the control stage. The skirt 43 comprises at least two radial protection portions 48 and at least one connecting portion 49. Each radial protection portion 48 is arranged radially opposite at least one phase connection 38 of the machine. Preferably, each axial protection portion 47 extends from a radial protection portion 48. In the example shown in FIG. 2, the skirt 43 comprises three radial protection portions 48, each being arranged radially opposite two phase connections 38. Alternatively, each radial protection portion could be arranged opposite a single phase connection or a number of phase connections greater than two.

The connecting portion 39 extends circumferentially between two radial protection portions 48. Therefore, the skirt is formed from a succession of radial protection portions 48 and connecting portions 49. The connecting portions 49 extend, in particular, in such a way as to be aligned axially in relation to each other. For example, in this instance, the skirt 43 forms a closed annular perimeter.

Figure 3:
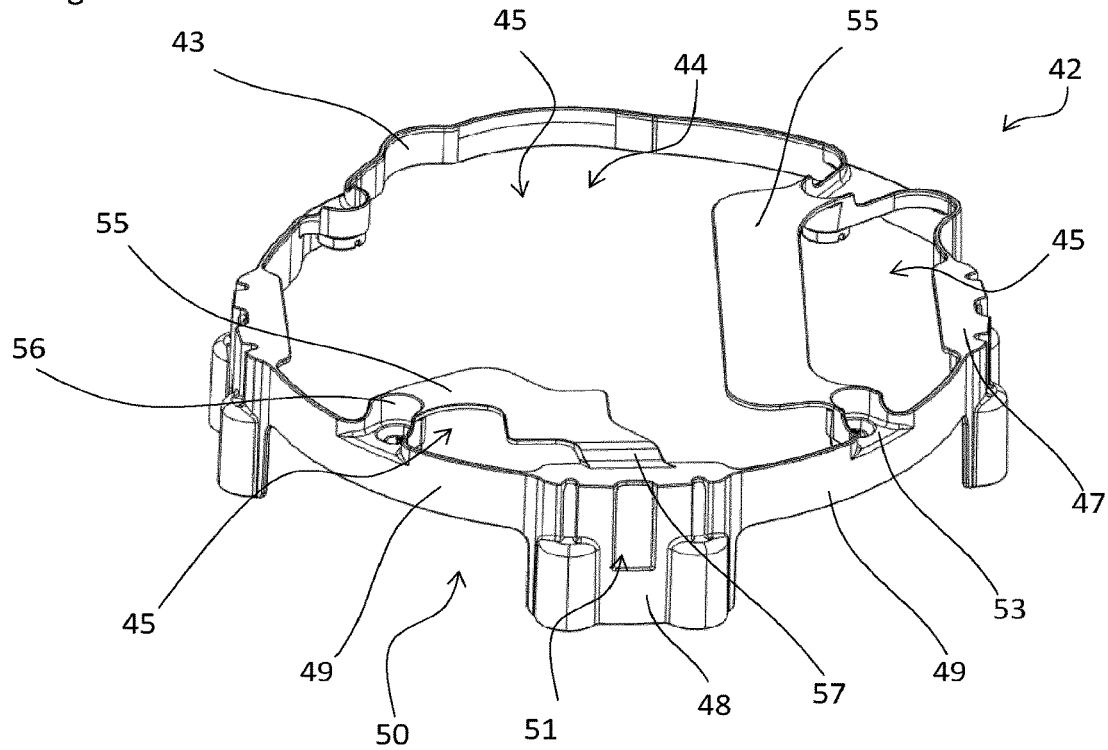
FIG. 3 shows a schematic and partial perspective view of the cover shown in FIG. 2.

As shown in FIG. 3, the connecting portion 49 has, in this instance, a height H2 less than the respective height H1 of the radial protection portions 48, the heights H1, H2 being measured in an axial direction. An axial end of the connecting portion 49 is, preferably, arranged so as to be aligned in a radial plane with an axial end of the adjacent radial protection portions 48.

In the example shown in FIG. 2, the height H2 of the connecting portion 49 is less than half the height H1 of the radial protection portions 48.

The difference in height between the radial protection portions 48 and the connecting portion 49 makes it possible to form a primary radial opening region in the cover 42. For example, the primary radial opening region is formed from one or more primary radial openings 50. Two radial protection portions 48 are separated from each other both by a connecting portion 49 and by a primary radial opening 50. The stack of the power stage and the control stage defines a cooling passage 52 between said stages, which can be seen in FIG. 2. Each primary radial opening 50 is arranged at least partially facing said cooling passage 52.

In the example of FIGS. 2 and 3, each radial protection portion 48 may comprise a secondary radial opening region, for example formed from one or more secondary radial openings 51. The secondary radial openings help improve the cooling of the inverter 36 and the phase connections 38 while allowing said connections to be protected from the external environment of the machine. For example, the area of the secondary radial opening region is between 15% and 25% of the area of the associated protection portion 48.

More specifically, in the example shown here, each secondary radial opening 51 extends from an axial end of the skirt and, in particular, from the associated axial protection portion 47. With continuing reference to this example, the secondary radial opening region is formed from three secondary radial openings 51. Two of said openings 51 are, in this instance, arranged axially between a respective phase connection 38 and the axial protection portion 47. The other opening 51 is, in this instance, arranged radially between two phase connections 38.

The cover 42 may comprise several fastening portions 53 arranged to mount said cover on the inverter 36. For this purpose, each fastening portion has, for example, an opening through which a fastening element 54 is inserted. The cover and the inverter are assembled together, in particular, by screwing or clip-fastening. In the example shown in FIG. 3, each fastening portion 53 extends radially from the skirt 43 into the inner portion of the cover 42 and, in particular, from a connecting portion 49. Each fastening portion 53 may be partially surrounded by a rim 56 extending axially in particular to stiffen said fastening portion.

The cover 42 may comprise a gripping means 55 making it possible, during the process of assembling the machine, to simplify the arrangement of the cover on the inverter 36 before they are fastened together. In the example shown in FIG. 3, the gripping means 55 is formed from a planar portion extending in a radial plane into the inner portion of the cover 42. This makes it possible, in particular, to use an automatic gripping device to position the cover 42 on the inverter 36. More specifically in this example, the cover comprises two gripping means 55. The first gripping means extends between two fastening portions 53 and the second gripping means extends between a fastening portion 53 and an axial protection portion 47. For example, each gripping means 55 extends axially at a non-zero axial distance from the skirt 43. In other words, in this instance, each gripping means 55 extends in a radial plane not comprising the skirt 43. For this purpose, each gripping means 55 extends more particularly from an axial end of the rim 56 partially surrounding the associated fastening portion 53 or from an axial set-back portion 57 formed between the axial protection portion 47 and said means 55.

A shown in FIG. 2, the axial end of the machine 10 is formed locally by several elements arranged in different radial planes: the signal connector 46, the heat sink plate 41, the cover 42 and, in particular, the gripping means 55 of the cover.

Figure 4:
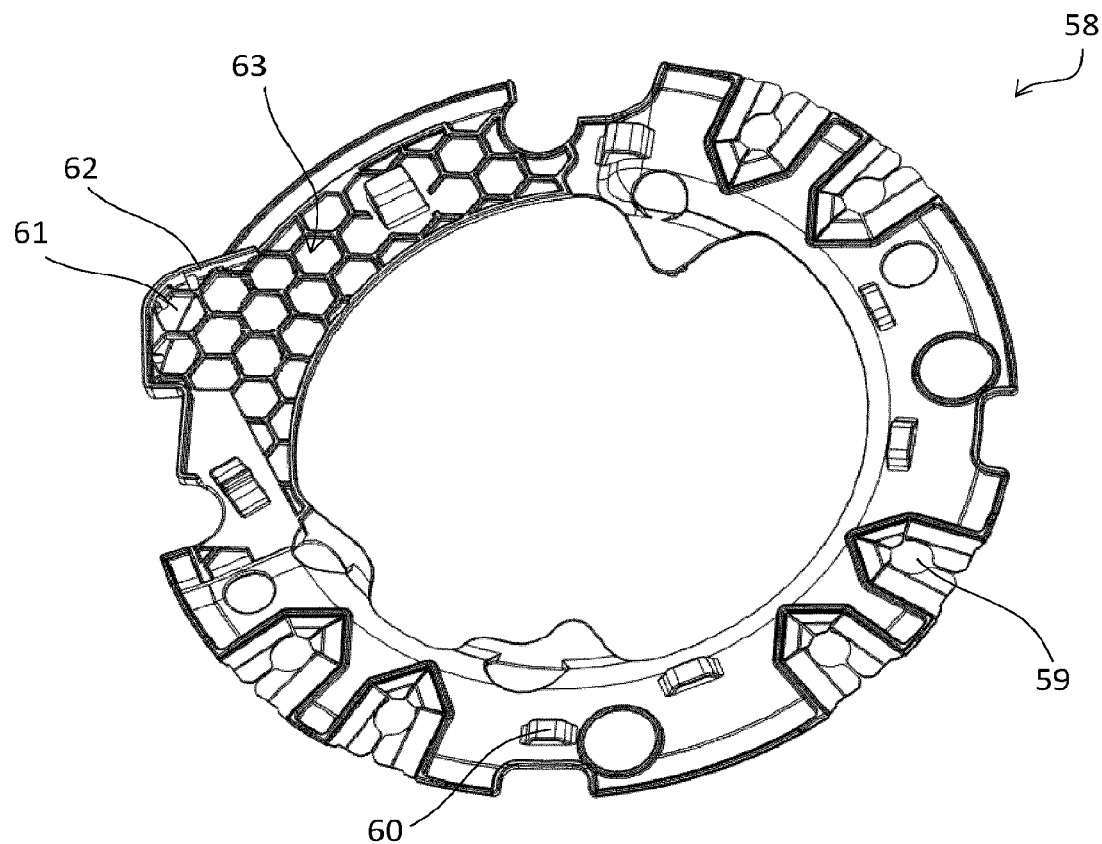
FIG. 4 shows a schematic and partial perspective view of an example of a shutter according to the invention.

As shown in FIGS. 1 and 4, the rotating electric machine 10 further comprises a shutter 58 arranged axially between the inverter 36 and the casing 11. More specifically in this instance, the shutter is mounted sandwiched between the rear end plate 17 and the first heat sink 39 and may comprise openings for the passage of an element for fastening the inverter 36 with the casing 11. The shutter may, moreover, comprise at least one damper 60 in order to help assemble the shutter in a more solid manner.

For example, the shutter 58 has an annular shape and is arranged in such a way as to at least partially cover axial openings formed in the rear end plate 17. The shutter 58 comprises openings 59 through which the phase outputs 33 of the stator can pass.

In the example shown in FIG. 4, the shutter 58 comprises a radially extending portion 61 arranged so as to be aligned in an axial direction with the capacitor bank 34 of the inverter 36. The radially extending portion 61 extends, in particular, in a radial direction, in such a way as to form an external radial projection of the shutter. For example, the radially extending portion 61 is surrounded on its outer periphery by a rim 62 extending axially.

The shutter is in particular formed from an electrically insulating material such as plastic. For example, at least one portion of the shutter 58 comprises a grooved area 63 helping to stiffen said shutter. The grooved area 63 extends in particular over the radially extending portion 61.

Figure 5:
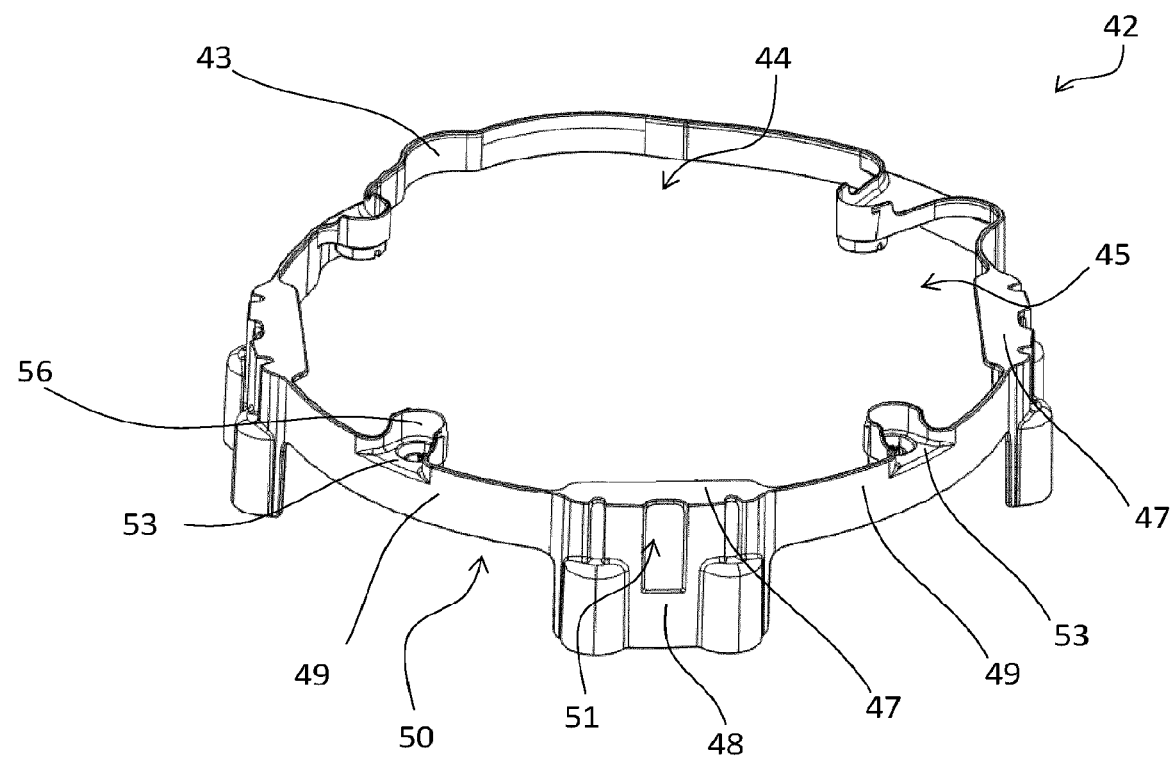
FIG. 5 shows a schematic and partial perspective view of another example of a cover according to the invention.

FIG. 5 shows another example of a cover 42 not comprising a portion specifically forming a gripping means 55. The other features and elements forming this cover are identical or essentially identical to those disclosed in the description of the first example of a cover described with reference to FIGS. 2 and 3.

Thus, in this second example of a cover 42, the open region 44 extends over at least 95% of the axial end area of the inner portion of the cover 42. In other words, in this instance, the entire area of the inner portion is open, apart from the areas forming the axial protection portions 47 and the areas forming the fastening portions 53. In this example, the open region 44 is formed from a single axial opening 45.

In one variant of this second exemplary embodiment, which is not shown, it is conceivable to modify the fastening portions 53 and the axial protection portions 47 so that they do not extend into the inner portion of the cover and to therefore further increase the opening percentage of the open region in order to obtain an opening percentage equal to 100%.

The present invention is applicable in particular in the field of alternators, starter-alternators or reversible machines, but it could also apply to any type of rotating machine.

Naturally, the preceding description has been given only by way of example and does not limit the field of the present invention, from which a departure would not be made by replacing the various elements with any other equivalents.

The invention claimed is:

1. A cover for a rotating electric machine comprising an axis of rotation, the cover being intended to be arranged on an inverter of said machine and comprising:
   a skirt extending in an axial direction and forming a perimeter of the cover, the perimeter defining an inner portion of the cover; and
   an open region arranged in the inner portion and comprising at least one axial opening,
   wherein the open region extends over at least 50% of the inner portion of the cover, and
   wherein the skirt forms a closed perimeter and comprises
      a plurality of radial protection portions, each radial protection portion being intended to be arranged radially opposite a phase connection of the machine,
      a plurality of connecting portions extending circumferentially between two radial protection portions of the plurality of radial protection portions, each connecting portion having a height in an axial direction that is less than a height in the axial direction of each of the radial protection portions, and
      a plurality of primary radial openings formed between two radial protection portions of the plurality of radial protection portions such that two radial protection portions of the plurality of radial protection portions are separated from each other by one of the plurality of connecting portions and one of the plurality of primary radial openings.

2. The cover as claimed in claim 1, wherein the open region extends over at least 70% of the inner portion of the cover.

3. The cover as claimed in claim 2, wherein the open region comprises several axial openings.

4. The cover as claimed in claim 2, further comprising an axial protection portion intended to be arranged axially opposite at least one phase connection of the machine, the axial protection portion extending into the inner portion.

5. The cover as claimed in claim 2, further comprising a fastening portion, the fastening portion being intended to cooperate with a fastening element in order to mount the cover on an inverter of the rotating electric machine, the fastening portion extending into the inner portion.

6. The cover as claimed in claim 2, further comprising gripping means extending into the inner portion.

7. A rotating electric machine comprising an inverter and a cover as claimed in claim 2, the cover being mounted on the inverter.

8. The cover as claimed in claim 1, wherein the open region comprises several axial openings.

9. The cover as claimed in claim 1, further comprising an axial protection portion intended to be arranged axially opposite at least one phase connection of the machine, the axial protection portion extending into the inner portion.

10. The cover as claimed in claim 1, further comprising a fastening portion, the fastening portion being intended to cooperate with a fastening element in order to mount the cover on an inverter of the rotating electric machine, the fastening portion extending into the inner portion.

11. The cover as claimed in claim 1, further comprising gripping means extending into the inner portion.

12. A rotating electric machine comprising an inverter and a cover as claimed in claim 1, the cover being mounted on the inverter.

13. The machine as claimed in claim 12, wherein the inverter comprises a capacitor bank and in that the open region is arranged so as to be at least partially axially aligned with the capacitor bank.

14. The machine as claimed in claim 13, wherein the inverter comprises at least one heat sink plate, said plate forming, at least partially, one axial end of said inverter and being arranged at least partially facing the open region.

15. The machine as claimed in claim 12, wherein the inverter comprises a heat sink plate forming, at least partially, one axial end of said inverter and being arranged at least partially facing the open region.

16. The machine as claimed in claim 12, further comprising a shutter arranged at one axial end of the inverter, the shutter comprising a radially extending portion arranged opposite a capacitor bank of the inverter.

* * * * *